Figure 1:
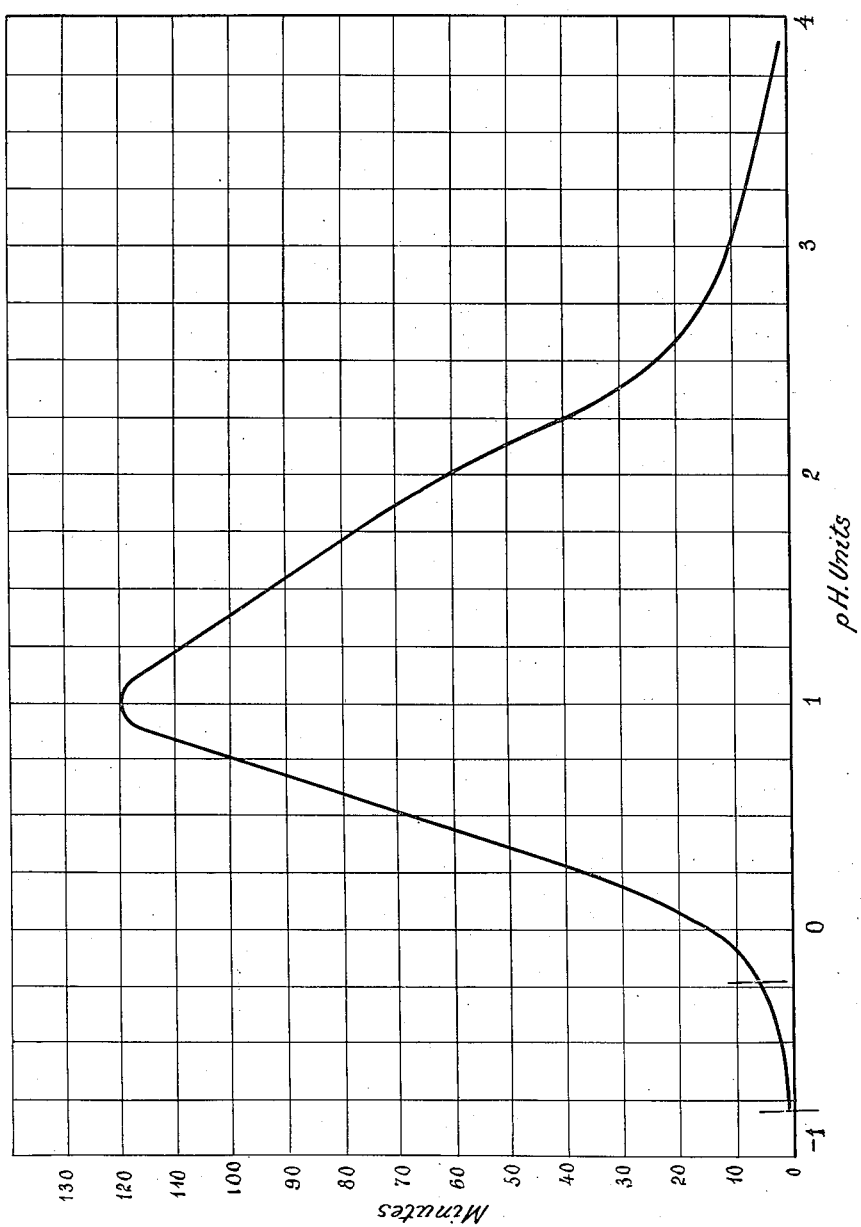

March 15, 1949.   M. M. MARISIC ET AL   2,464,329
PROCESS OF FORMING LOW pH HYDROGEL BEADS
Filed Sept. 2, 1943   2 Sheets-Sheet 1

INVENTORS.
MILTON M. MARISIC
ARTHUR C. SCHMITT
BY
Oswald G. Hayes
ATTORNEY.

March 15, 1949. M. M. MARISIC ET AL 2,464,329
PROCESS OF FORMING LOW pH HYDROGEL BEADS
Filed Sept. 2, 1943 2 Sheets-Sheet 2
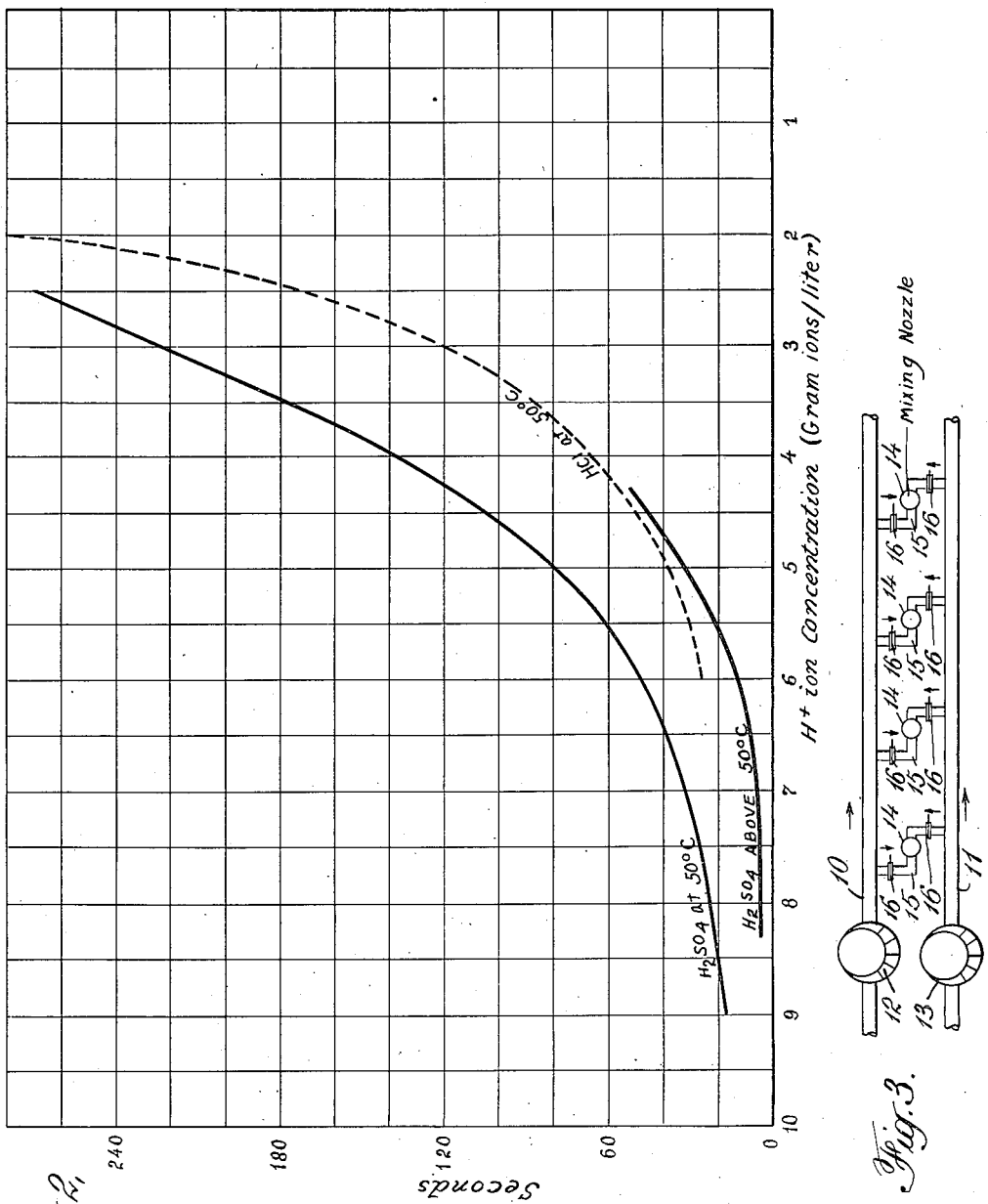
INVENTORS
MILTON M. MARISIC
ARTHUR C. SCHMITT
BY
ATTORNEY.

Patented Mar. 15, 1949

2,464,329

UNITED STATES PATENT OFFICE 2,464,329

PROCESS OF FORMING LOW pH HYDROGEL BEADS

Milton M. Marisic, Woodbury, and Arthur C. Schmitt, Wenonah, N. J., assignors to Socony-Vacuum Oil Company, Incorporated, a corporation of New York Application September 2, 1943, Serial No. 500,938

1 Claim. (Cl. 252—259.2)

This invention pertains to the preparation of pellets consisting of or comprising silica in porous form and is particularly concerned with a process for forming such pellets, the product so obtained, and with processes for conversion of hydrocarbon oils using such pellets as catalyst.

In the preparation of porous compositions of silica, it has long been the common practice to separate hydrous silica, alone or in combination with other metal oxides, as precipitates, gels or mixtures of the two forms from suitable aqueous solutions. In the prior copending application of Milton M. Marisic, Serial No. 461,454, filed October 9, 1942 (now U. S. Patent No. 2,385,217), a process is described for forming such compositions into smooth surfaced particles by preparing an aqueous sol which sets to a gel after an appreciable lapse of time, dividing the sol into portions each containing a small amount of sol corresponding approximately to the amount of oxides desired in finished individual pellets and permitting separate gelation of each portion. Preferably, the individual portions are prepared by injecting the sol into the top of a column of oil wherein the sol separates into globules of liquid sol. The composition of the sol, its concentration and other variables, are regulated so that as the globules fall through the oil they set to a hydrogel and thus form spheroidal beads of gel which are then treated, as by washing and drying, to yield the desired product. Alternatively, the sol may be gelled in a mold or in any other manner suited to the purpose to be served. The product may be utilized as an adsorbent to dry gases, to purify or to recover hydrocarbons or other fluids; as a catalyst or catalyst support; as a water softening composition; or in any of the other various processes to which it is adapted. This invention is particularly concerned with preparation of catalysts, for example, such as are used in the catalytic cracking of hydrocarbon oils.

In the formation of silica bearing particles by gelation in a desired form, the gelation time is an important factor. This time should be so adjusted as to afford ample time for dividing the sol and forming it, but a short gelation period is desirable in order that equipment shall not be rendered unduly large. The sol is therefore prepared so as to have a gelation period on the order of 5 to 30 seconds and it is highly desirable that the gelation time shall remain uniform throughout the process. The variations in gelation time with pH has made it necessary to very carefully meter the solutions which are mixed to form the sol and in designing commercial plants, it is found desirable to provide a large number of metering devices, such as pumps and rotameters. Each stream admitted to a mixing nozzle requires a separate metering pump and measuring device.

We have now found that the necessity for extremely accurate control of reactant solutions used to produce the gelable sol may be largely avoided by preparing the sol at an acid concentration greater than one gram ion per liter. This discovery permits the operation of a battery of mixing nozzles connected in parallel by utilizing only one metering pump and one measuring device for each reactant solution admitted to a multiplicity of nozzles. Orifices inserted in the conduits connecting the mixing nozzles with the metering pump suffice to regulate the quantity of reactant solution admitted to each nozzle.

Gels prepared at high acid concentrations often involve a sacrifice in activity if the product is to be used as a catalyst for the cracking of hydrocarbon oils. Such catalysts prepared by forming silica pellets at high acidity according to this invention followed by impregnation with alumina, thoria, zirconia, beryllia and the like, are not as efficient for this purpose as are the beads produced by joint gelation of silica with alumina at higher pH as specifically disclosed in the said prior application of Marisic. Pellets containing both silica and alumina (or other metal oxide) may be prepared by the present process if care is taken to retain the additional oxide. It may be noted that washing of these highly acid gels with water tends to remove such oxides as alumina which are soluble in mineral acid solutions. This can be largely avoided by immersing the gel as formed in alkaline solution, e. g., ammonia before submitting it to washing with water.

Figures 1 and 2 of the annexed drawings illustrate the relation between gelation time and acid concentration. Figure 3 is a diagrammatic illustration of a battery of mixing devices such as can be operated by use of the present invention.

Figure 1 shows the relationship existing between the gelation time in minutes and the hydrogen ion concentration expressed in pH units. The colloidal silica solutions were formed at 50° C. by mixing hydrochloric acid and "N" brand sodium silicate which was diluted to contain 212 grams silica per liter. The concentration of $SiO_2$ in the hydrogel was 10.6% in each case. Examining Figure 1, it is noted that starting with pH 4 and increasing the acidity, the gelation time rises rapidly to a maximum at pH 1; further increase in acid results in shorter gelation times. It is apparent that at acid concentrations greater than pH $-0.5$ the gelation time is affected only slightly by changes in hydrogen ion concentration. The two extremities of the curve are not to be confused as being similar, for pH is a logarithmic function and hence variations in hydrogen ion concentration in the region of minus pH are not comparable with the same variation in the plus pH scale. This seeming anomaly is eliminated when it is realized that the difference in hydrogen ion concentration between pH 4 and pH 3 is 0.0009 gram ion of hydrogen per liter, whereas the difference between pH −0.7 and pH −0.8 is 1.28 grams ions of hydrogen per liter.

Figure 2 exemplifies the connection between gelation time expressed in seconds and the hydrogen ion concentration in gram ions of hydrogen per liter of silica sol. The broken line curve is a portion of the graph in Figure 1 lying between pH −0.78 and −0.2, as indicated by vertical broken lines on Figure 1. The other two curves represent silica hydrogels prepared at two different temperatures from water glass and sulfuric acid. Increasing the temperature shifts the curves toward the right and hence moves the portion of the curve in which the gelation time is least sensitive to variations in acidity to the lower hydrogen ion concentration range. Attention is directed to the similarity between the broken line curve which is for gels from hydrochloric acid at 50° C. and the curve drawn through the squares for gels from sulfuric acid at 50° C. Curves obtained with diverse acids are not necessarily superimposable; this consequence and the effect of temperature permit the application of this invention to the preparation of silica hydrogels at any desired acidity above one gram ion of hydrogen per liter.

The two curves drawn with continuous lines in Figure 2 were obtained from the reaction of 20 normal sulfuric acid with water glass prepared by diluting "N" brand sodium silicate to a silica concentration of 212 grams per liter. In mixing these solutions the volume of acid was varied; while the volume of water glass solution was maintained constant to yield the noted order in acidity. The concentration of silica in the hydrogel was 17.7%, 12.5% and 10.6% at hydrogen ion concentrations 2.52, 7.0, and 8.95, respectively. Variation in concentration of silica in this range has little effect on the gelation time, hence, these curves are similar to the dotted curve for which the silica concentration was constant.

A water glass solution was prepared by diluting 27.40 pounds of "N" brand of sodium silicate (28.7% $SiO_2$, 8.9% $Na_2O$) with 17.68 pounds of water. This solution contained 212 grams $SiO_2$ and 66 grams $Na_2O$ per liter.

The water glass solution was mixed in a nozzle mixer with 38% hydrochloric acid solution (specific gravity 1.19) in the ratio of 250 volumes of the former to 300 volumes of the latter to form a silica sol which was introduced at the top of a column of oil ten feet deep, wherein the sol was dispersed into globules which set to a gel before passing into the layer of water located beneath the oil. The hydrogel beads were conducted out of the bottom of the column by means of a stream of water and then washed until free of soluble salts. The wash water contained a considerable amount of hydrochloric acid which was recovered by conventional means. After drying the washed silica hydrogel pellets slowly at 180° F. until shrinkage was substantially complete at this temperature, they were dehydrated further by gradually heating to 800° F. and maintaining them at this temperature for five hours. Spherically shaped silica pellets prepared in this manner are excellent adsorbents and contacting agents.

The hydrogen ion concentration of the silica sol formed above was 5.47 grams ions per liter, while the gelation time was 30 seconds. The solutions were mixed at room temperature; however, due to the heat of reaction, the actual temperature of the sol was 45° C. Mineral oil having a specific gravity of 0.905 at 60° F. and a viscosity of 320 Saybolt seconds at 100° F. was employed in the column.

A catalyst suitable for hydrocarbon conversion was prepared from the washed silica hydrogel pellets by soaking in 30% $Al(NO_3)_3·9H_2O$ overnight and then drying the pellets as already described for silica gel except that the final temperature was 1100° F. instead of 800° F. This catalyst was tested in the cracking of a fraction of Oklahoma City gas oil boiling between 470° and 708° F. The oil was conducted through the catalyst bed at a liquid space velocity of 1.5 and a temperature of 800° F. for ten minute "on stream" times. Fifty-two per cent of the oil charged was converted to gasoline having a 400° F. endpoint.

In Figure 3 a typical supply set-up for a plant utilizing a plurality of mixing nozzles for preparation of gelable sol is illustrated diagrammatically. Two suitable solutions, supplied by pipes 10 and 11 from pumps 12 and 13 are furnished to a plurality of mixing nozzles 14 by branch lines 15. Each of the lines 15 is fitted with means for controlling flow therein, as for example, orifice plates 16. Such a supply system can be utilized when advantage is taken of the principles of this invention by operating in an acidity range wherein relatively large fluctuations in hydrogen ion concentration cause relatively small variations in gelation time.

We claim:

The process which comprises supplying a stream of each of two reactant solutions capable of reacting to form a gelable hydrosol containing silica, metering said streams in relative proportions to form said sol at a hydrogen ion concentration greater than pH=−0.5, diverting equivalent proportionate parts of each of said streams to each of a plurality of continuous mixing zones, continuously mixing the so-diverted portions in transit in each of said mixing zones, discharging the resultant hydrosol from each of said mixing zones into a body of a liquid immiscible therewith wherein said hydrosol separates in globules and retaining said globules in said liquid until gelation occurs; whereby sol of substantially constant gelation time is discharged from each of said mixing zones regardless of incidental variations in said diversions by reason of the fact that gelation time is substantially constant with respect to hydrogen ion concentration in said sol.

MILTON M. MARISIC.
ARTHUR C. SCHMITT.

REFERENCES CITED

The following references are of record in the file of this patent:

UNITED STATES PATENTS

| Number | Name | Date |
|--------|------|------|
| 1,297,724 | Patrick | Mar. 18, 1919 |
| 1,646,297 | Lindsay | Oct. 18, 1927 |
| 1,674,558 | Miller | June 19, 1928 |
| 1,949,360 | Schorger | Feb. 27, 1934 |
| 2,272,301 | Kinneberg et al. | Feb. 10, 1942 |
| 2,302,297 | Connolly | Nov. 17, 1942 |
| 2,326,523 | Connolly et al. | Aug. 10, 1943 |
| 2,339,838 | Connolly | Jan. 25, 1944 |
| 2,385,217 | Marisic | Sept. 18, 1945 |

OTHER REFERENCES

Hurd et al.: "Journal of Physical Chemistry," vol. 44 (1940), pp. 847–851.

Certificate of Correction

Patent No. 2,464,329. March 15, 1949.

MILTON M. MARISIC ET AL.

It is hereby certified that errors appear in the printed specification of the above numbered patent requiring correction as follows:

Column 4, line 4, for the word "conversion" read *conversions*; line 6, for "$Al(NO)_3 \cdot 9H_2O$" read *$Al(NO_3)_3 \cdot 9H_2O$*;

and that the said Letters Patent should be read with these corrections therein that the same may conform to the record of the case in the Patent Office.

Signed and sealed this 27th day of September, A. D. 1949.

[SEAL]

THOMAS F. MURPHY,
*Assistant Commissioner of Patents.*